Dec. 12, 1961  E. J. WUDEL  3,012,771
STANDS FOR SUPPORTING AUTOMOBILE POWER TRAINS AND THE LIKE
Filed Dec. 23, 1959  2 Sheets-Sheet 2
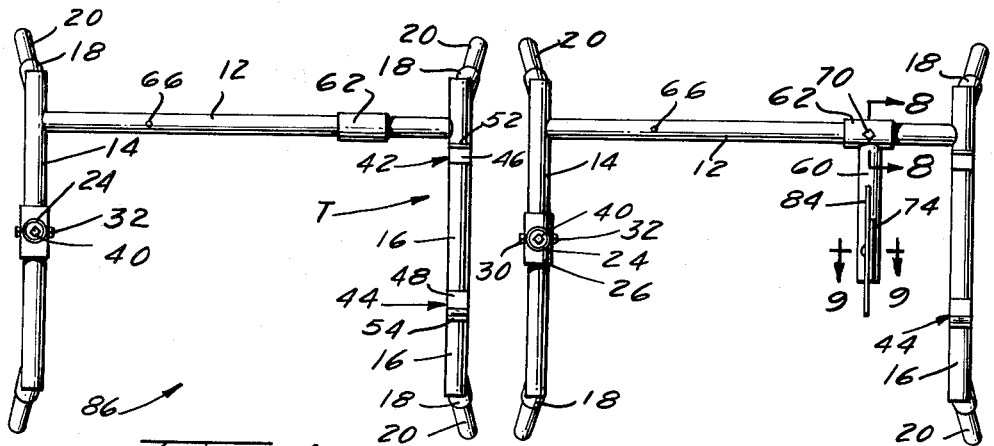
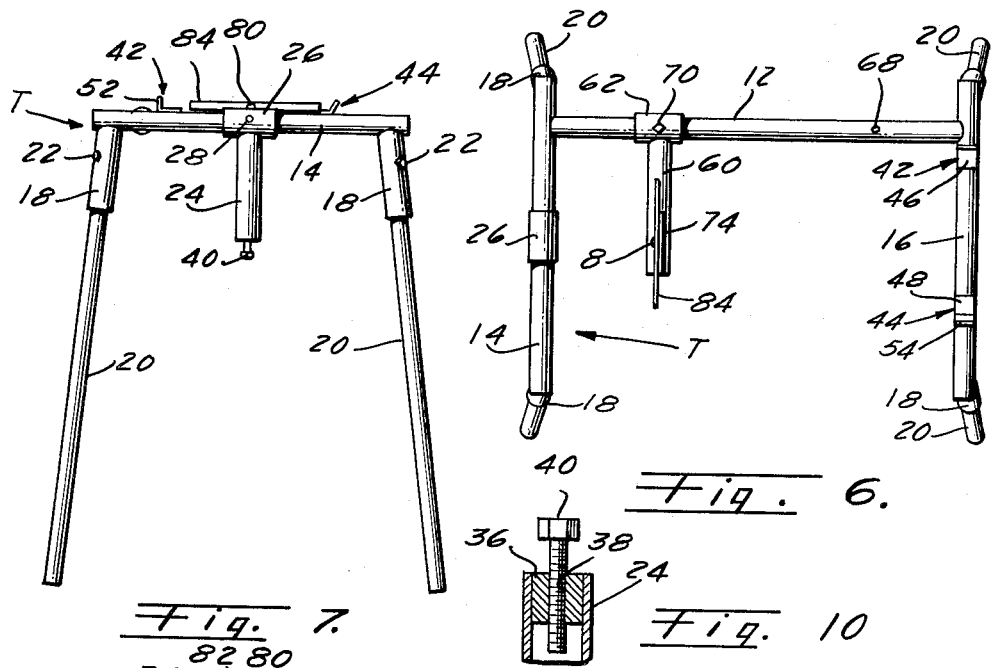
Edmund J. Wudel,
INVENTOR.
BY
Attorney

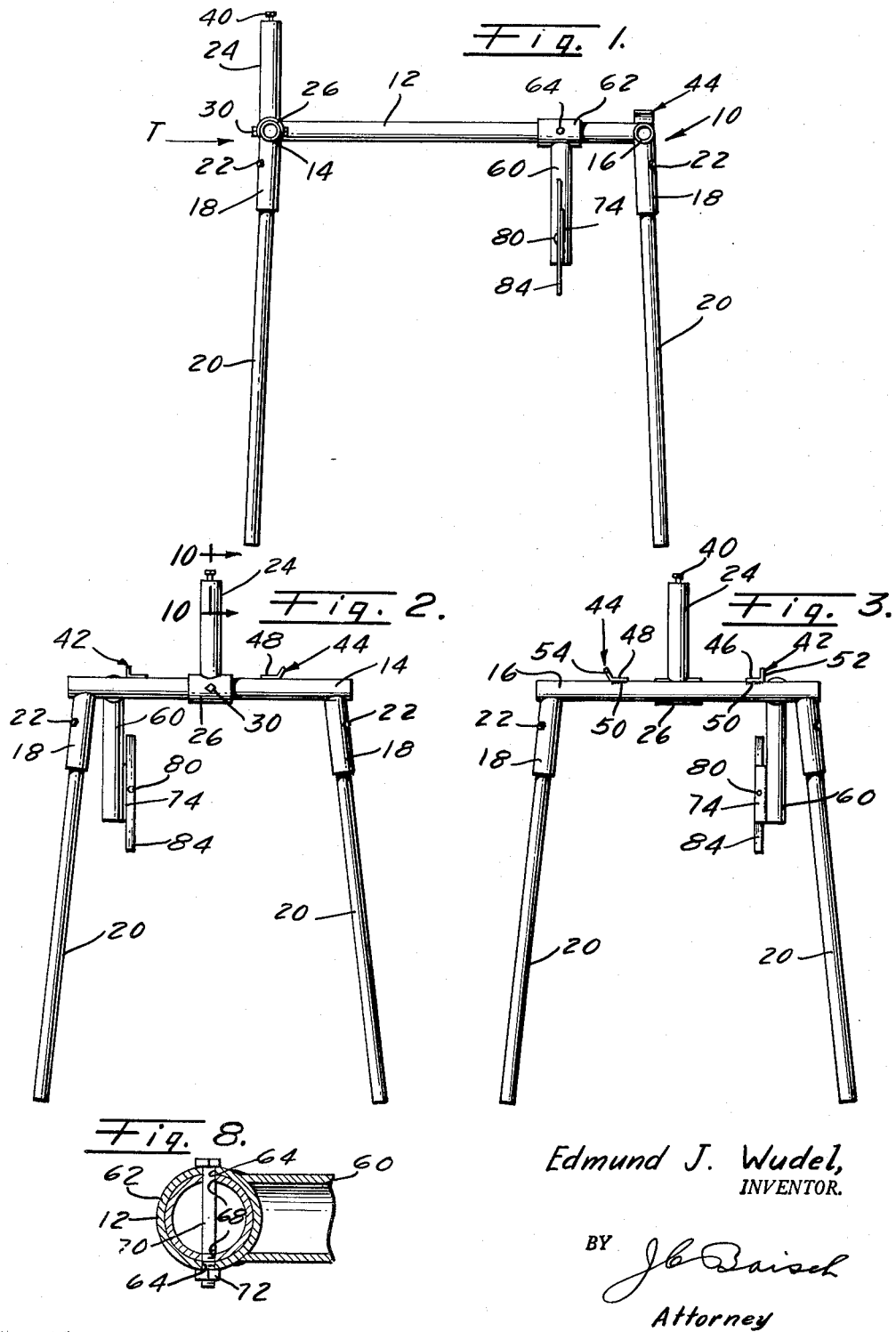

United States Patent Office 3,012,771
Patented Dec. 12, 1961

3,012,771
STANDS FOR SUPPORTING AUTOMOBILE POWER TRAINS AND THE LIKE
Edmund J. Wudel, 1420 Senic Drive, Whittier, Calif.
Filed Dec. 23, 1959, Ser. No. 861,635
6 Claims. (Cl. 269—191)

This invention relates to stands, and relates more particularly to stands for supporting mechanisms while work is being done thereon.

While the invention has particular utility in the servicing of the power train of the Chevrolet Covair, and is shown and described in such connection, it is to be understood that its utility is not confined thereto. The term train as used herein comprises the engine, transmission and differential of the Corvair.

It is an object of the invention to provide a safe and solid stand for supporting a power train while work is being done thereon.

It is another object of the invention to provide a stand of this character on which a power train may be easily placed thereon by means of a jack. The jack may then be used for other work, as removal and/or installation of the "Transaxle," which is the transmission and differential of the Corvair.

It is still another object of the invention to provide a stand of this character which permits easy accessibility to the engine placed thereon. In other words, it is easy to work around the engine when placed on the stand.

It is a further object of the invention to provide a device of this character which provides proper support for the "power train" but permits ready access into either end of the engine.

It is a still further object of the invention to provide a stand of this character, which will permit removal of the pan of an engine supported on said stand.

It is another object of the invention to provide a stand of this character which will permit a test run of an engine disposed thereon.

It is still another object of the invention to provide a stand of this character that is relatively inexpensive to manufacture.

The characteristics and advantages of the invention are further sufficiently referred to in connection with the following detailed description of the accompanying drawings, which represent one embodiment. After considering this example, skilled persons will understand that variations may be made without departing from the principles disclosed, and I contemplate the employment of any structure, arrangements or modes of operation that are properly within the scope of the appended claims.

Referring to the drawings, which are for illustrative purposes only:

FIG. 1 is a side elevational view of an engine support stand embodying the present invention;

FIG. 2 is an end view thereof;

FIG. 3 is a view of the opposite end;

FIG. 4 is a top plan view thereof;

FIG. 5 is a top plan view with the position of the arms in an alternative position, respectively;

FIG. 6 is a top plan view with the arms in another position;

FIG. 7 is an end view showing the arms disposed as shown in FIG. 6;

FIG. 8 is an enlarged sectional view taken on line 8—8 of FIG. 5;

FIG. 9 is an enlarged sectional view taken on line 9—9 of FIG. 5; and

FIG. 10 is an enlarged sectional view taken on line 10—10 of FIG. 2.

Referring more particularly to the drawings, there is shown a stand embodying the present invention and comprising a top part, indicated generally at T, having a longitudinally extending side member 12 which may be of any suitable character, although said member is shown as being tubular. The ends of the member 12 are secured to end members 14 and 16, respectively, adjacent the ends of said end members, as best shown in FIGS. 4, 5 and 6, said members being secured together by welding or any other suitable means.

Viewed from above the top part T of the device is generally U-shaped, the U being inverted as shown in FIGS. 4, 5 and 6.

Adjacent each end of each of the end members 14 and 16 there is a depending sleeve 18, the upper end of each sleeve being secured to the adjacent end of the respective end members by welding or the like, said sleeves being open at the lower ends, and it is to be noted that sleeves 18 are inclined from the perpendicular, both outwardly relative to the sides of the device, and also outwardly relatively to the ends of said device.

There is a leg 20 for each sleeve 18 and the upper ends of said legs are slidably inserted into the respective sleeves. Sleeves 18 are provided with diametrically arranged or aligned openings therein for reception of screws 22 and the upper ends of said legs 20 are provided with similar openings which, when said legs are inserted into said sleeves, are in register with the openings in the sleeves so that said bolts 22 may be passed through the aligned openings in the sleeves 18 and the similarly aligned openings in the legs. One of the openings in each sleeve is tapped and free ends of said screws are screwed therein to thereby secure the legs 20 in the sleeves 18. The legs 20 provide support for the upper part T of the device and since they are inclined similarly to the inclination of the sleeves 18, said legs serve to brace the upper part T and hold same steady. This arrangement has been found to be extremely sturdy and well adapted to safely support power trains which, of course, are quite heavy.

One of the end members, shown as 14, is provided with an arm 24 secured by welding or the like to a movable sleeve 26 which is slidably disposed on the end member 14. Sleeve 26 is provided with oppositely arranged aligned openings 28 on an axis normal to the axis of the arm 24, and said openings 28 are adapted to register with openings in the end member 14 intermediate the ends thereof when the arm 24 is in an upright position, as best shown in FIGS. 1, 2 and 3. A bolt 30 is removably disposed in the openings in the sleeve 26 and aligned openings in the end member 14, and said bolt is secured in position by means of a nut 32. The free end of the arm 24 is provided with a plug or insert 36, which is secured in said free end by any suitable means such as welding or the like. Plug 36 is provided with a longitudinally extending tapped bore 38 in which a screw or bolt 40 is threadably disposed.

The opposite end member 16 is provided with a pair of brackets 42 and 44 having parts 46 and 48 respectively secured to the end member 16 by means of welding, as indicated at 50, brazing, or any other suitable means.

Bracket 42 is provided with an upright part 52 at right angles to the part 46, while bracket 44 is provided with an upwardly inclined part 54 at an obtuse angle to the part 48, said part 54 being inclined outwardly and away from the bracket 42.

It is to be understood, of course, that the arm 24 may be disposed on the end member 16 and the brackets 42 and 44 may be disposed on the end member 14. Also the parts 52 and 54 of the brackets 42 and 44 may be otherwise angularly arranged relative to the end member to which said brackets are attached, to accommodate and properly hold a power train unit disposed on the stand.

Side member 12 is provided with an arm 60 having one end secured, by welding or other suitable means, to a sleeve 62 slidably and rotatably mounted on said side member 12. Sleeve 62 is provided with oppositely arranged openings 64, FIG. 8, adapted to be aligned or registered with a pair of aligned openings 66 adjacent one end of the side member 12 but spaced from the adjacent end member 14 or aligned with a pair of aligned openings 68 in said side member 12 adjacent the opposite end and spaced from the adjacent end member 16. The openings 66 and 68 are on a vertical axis and when the openings 64 of the sleeve 62 are aligned or registered with either sets of openings 66 or 68, the arm 60 is horizontally positioned. A bolt 70 is removably disposed in the openings 64 and the openings 66 or 68 depending on which of the openings in the side 12 said openings 64 are in register. A nut 72 secures the bolt 70 in position.

When the arm 60 is in the horizontal position and extending into the U defined by the members 12, 14 and 16, the then upper side is provided with a flange 74 adjacent the free end thereof. Flange 74 may be secured to the arm 60 by means of welding 76 or by any other suitable means. A transverse or horizontal, tapped bore 78, is provided in the flange 74 intermediate its ends and receives a rivet 80 which is also pivotally received in an opening 82 provided in a balancing or equalizing member 84 intermediate the ends of said member. The member 84 is adapted to pivot sufficiently on the rivet 78 to accommodate that part of the power train resting thereon, as will be more particularly described hereinafter.

It is to be noted that the present device comprises a skeleton stand having a side closed by the side member 12 and an open side 86, best shown in FIGS. 4, 5 and 6.

When it is desired to work on a power train such as used in the Corvair automobile, for example, removal of the engine is effected in the usual, known manner, a hydraulic jack of known type being used to support the power train during removal and for moving same over to the stand. The power train is raised sufficiently so as to be higher than the top of the stand, the power train being moved over the stand from the open side thereof. This open side permits the jack to move beneath the top of the stand so that the power train will be disposed over the horizontal members 12, 14, and 16 of the top part T. It is to be understood that the arm 24 is secured in the upright position by means of the bolts 28. The rear motor mount then rests on the upper end of the arm 24, and the bolt 40 which has previously been removed is passed through an opening in the rear motor mount and screwed into the tapped opening 38 which is in register with said opening in the motor mount. Thus the power train mechanism is secured to the top of the stand. The bottom of the fly wheel housing has two flat spots which rest on the brackets 42 and 44, and which aid in retaining the power train mechanism in position on the stand and against displacement.

When the power train is thus disposed on the stand the pan may be removed to permit work on the interior of the engine. Other work may be done on the power train mechanism when supported as above described.

Should it be desired to remove the fly wheel housing the engine is slightly raised by means of a jack, referred to above, and the arm 60 moved to the horizontal position adjacent the end member 16. The bolt 70 is then passed through the openings 64 in the sleeve 62 and the openings 68 in the side member 12, the nut 72 then being screwed onto the depending end of the bolt 70. The power train mechanism is then lowered so that the portion of the pan adjacent the arm 60 rests on the equalizing member 84 which pivots slightly on the screw 80, thus permitting the mechanism to be suitably supported across the part of the pan resting on said member 84. The fly wheel housing may then be removed so that work may be performed at this end of the engine.

When work is to be performed on the other end of the power train mechanism the bolt 40 is removed from the arm 24 and the mechanism raised somewhat by means of a jack. Bolt 40 is then removed and the arm 24 swung to the depending position shown in FIG. 7. The arm 60 is then raised to the horizontal position adjacent the arm 14 and secured in said position by means of the bolt 70 which is passed through the opening 64 in the sleeve 62 and the openings 66 in the member 12. The mechanism is then lowered so that the end of the pan adjacent the arm 60 rests on the equalizing member 84. The cover plate may then be removed so work may be performed on the part of the mechanism normally covered by said plate.

After the work has been finished the cover plate is replaced.

It has been found that test runs of the engine may be readily made when the power train mechanism is in the first described position on the stand.

When it is desired to remove the mechanism from the stand when in the first mentioned position, the bolt 40 must be removed from the arm 24. The jack is then used to raise the engine from the top of the stand and the latter is then pulled from beneath the mechanism, the jack part which extends upwardly above the plane of the top of the stand passing through the open side 86. When the mechanism is otherwise supported as above described, the jack is used to raise said mechanism and to move same from above the top part of the stand by moving the stand from beneath the mechanism in the direction of the side 12. Alternatively, when the mechanism has been raised by the jack the latter may be moved outwardly relative to the side 86.

It is to be understood that after the power train mechanism has been placed on the stand the jack may be lowered and used for other purposes so that the jack is not tied up during the time the power train is on the stand.

While the various parts of the stand are disclosed herein as being tubular, it is to be understood that they may be otherwise constructed to carry out the functions and purposes thereof.

As has been pointed out above, the legs are removably secured in their respective holders or sleeves. Thus legs of different heights may be used in accordance with the height desired for the stands. Also, by removing the legs the device may be easily packaged in a compact package as for storage, shipping, or the like.

It is thought that the invention and many of its attendant advantages will be understood from the foregoing description and it is believed that it will be apparent that various changes may be made in the form, construction and arrangement of the parts of the invention without departing from the spirit and scope thereof or sacrificing all of its material advantages, the embodiment hereinbefore described being merely for the purpose of illustration.

I claim:

1. A skeleton stand for power trains, comprising: a top part having end members arranged parallel to each other and laterally spaced apart; a side member having its ends secured to the respective end members adjacent the ends of the latter, the opposite side of said top part being open; tubular sleeves having their upper ends secured to and depending from the end members adjacent respective ends of said end members, said sleeves being inclined somewhat outwardly relative to respective adjacent sides and somewhat outwardly relative to the respective ends; a leg for each sleeve, said legs having parts being removably received within said sleeves; means for releasably securing the legs in respective sleeves; a sleeve rotatably mounted on one of the end members; an arm having one end secured to said sleeve at an angle normal to the end member on which said sleeve is disposed; means for releasably securing said sleeve on its end member with the arm upright; a screw threadably disposed in the free end of said arm on the axis of said arm; a pair of brackets secured to the upper side of the other end member, said brackets being spaced apart and one of said brackets being a right angle bracket, the other of said brackets being obtuse; a sleeve slidably and rotatably mounted on the side member; a second arm, said second arm having one end secured to the sleeve on the side member of said arm, normal to the axis of said side member; means for releasably securing said sleeve against rotation and longitudinal movement on the side member adjacent to but spaced inwardly from respective end members, with the second arm horizontal and substantially parallel with the end members; a flange on the upper side of said second arm when the latter is in said horizontal position; an equalizer member for said second arm; and pivot means on said flange having an axial parallel to the side member, said equalizer member being pivotally mounted adjacent its longituidnal center on said pivot means so that said equalizer member will have limited rocking motion relative to the second arm, said equalizer member extending beyond the free end of said second arm.

2. A skeleton stand for power trains, comprising: a top part having end members arranged parallel to each other and laterally spaced apart; a side member having its ends secured to the respective end members adjacent the ends of the latter, the opposite side of said top part being open; tubular sleeves having their upper ends secured to and depending from the end members adjacent respective ends of said end members, said sleeves being inclined somewhat outwardly relative to adjacent sides and somewhat outwardly relative to the respective ends; a leg for each sleeve, said legs being removably secured to said sleeves; a sleeve rotatably mounted on one of the end members; an arm having one end secured to said sleeve at an angle normal to the end member on which said sleeve is disposed; means for releasably securing said sleeve on said end member with the arm upright; a screw threadably disposed in the free end of said arm, a pair of brackets secured to the upper side of the other end member, said brackets being spaced apart; a sleeve slidably and rotatably mounted on the side member; a second arm, said second arm having one end secured to the sleeve on the side member, the said arm normal to the axis of said side member; means for securing said sleeve against rotation and longitudinal movement on the side member adjacent either of the end members with the second arm extending horizontally inwardly of said top part and substantially parallel with the end members; a flange on the upper side of said second arm when the latter is in a horizontal position; and an equalizer member for said second arm pivotally mounted on said second arm adjacent the longitudinal center of said equalizer member, said equalizer member having limited rocking motion relative to the second arm.

3. In a stand for power trains and the like: a top part having end members arranged parallel to each other and spaced apart; a side member having its ends secured to the respective end members adjacent the ends of the latter, the opposite side of said top part being open; legs removably secured to the end members adjacent respective ends of said end members, said legs being inclined somewhat outwardly relative to adjacent sides and somewhat outwardly relative to the respective ends; an arm rotatably mounted on one of the end members at an angle substantially normal to said end member; means for releasably securing said arm in an upright position on said end member; a screw threadably disposed in the free end of said arm; a pair of brackets secured to and spaced apart on the upper side of the other end member; a second arm rotatably and slidably mounted on said side member at an angle normal to said side member; means for securing said second arm against rotation and longitudinal movement on the side member adjacent either of the end members with the second arm extending substantially horizontally inwardly of said top part; and an equalizer member rockingly mounted on said second arm and at the upper side when said second arm is in said horizontal position.

4. In a stand for power trains and the like: a top part having end members arranged parallel to each other and spaced apart; a side member having its ends secured to the respective end members adjacent the ends of the latter, the opposite side of said top part being open; an arm rotatably mounted on one of said end members; means for releasably securing said arm upright on said one end member; securing means disposed in the free end of said arm; bracket means secured to the upper side of the other end member; a second arm slidably and rotatably mounted on said side member; means for securing said arm in an inwardly extending, substantially horizontal position on the side member adjacent either of the end members; and an engine pan engaging member pivotally mounted on the second arm with the top of said pan engaging member above the upper side of said second arm when the latter is in said horizontal position.

5. In a stand for power trains and the like: a top part in the shape of a U lying in a horizontal plane and having end members arranged parallel to each other and spaced apart; a side member having its ends secured to the respective end members adjacent the ends of the latter, the opposite side of said top part being the open side; an arm rotatably mounted on one of said end members; means for releasably securing said arm upright on said one end member; bracket means secured to the upper side of the other end member; a second arm slidably and rotatably mounted on said side member; means for securing said arm in inwardly extending, substantially horizontal positions on the side member adjacent either of the end members; and an engine pan engaging member rockagly mounted on the second arm with the top of said pan engaging member above the upper side of said second arm when the latter is in said horizontal position.

6. In a stand for power trains and the like: a top part having end members arranged parallel to each other and spaced apart; a side member having its ends secured to the respective end members adjacent the ends of the latter, the opposite side of said top part being open; bracket means secured to the upper side of one end member; an arm slidably and rotatably mounted on the side member; means for securing said arm in inwardly extending, substantially horizontal position on the side member adjacent either of the end members; and an engine pan engaging member pivotally mounted on the second arm with the top of said pan engaging member above the upper side of said second arm when the latter is in said horizontal position.

References Cited in the file of this patent

UNITED STATES PATENTS

| | | |
|---|---|---|
| 1,481,503 | Carswell et al. | Jan. 22, 1924 |
| 1,495,894 | Du Bois | May 27, 1924 |
| 1,580,627 | Peterson | Apr. 13, 1926 |
| 1,600,835 | Manley | Sept. 21, 1926 |
| 2,463,966 | Hauschild | Mar. 8, 1949 |